Feb. 24, 1959 I. A. GROSS 2,875,264

BRACKET MEANS FOR JOINING PRINTED CIRCUIT PANELS

Filed May 31, 1956

INVENTOR
Irving A. Gross
BY Evans & Pearne
ATTORNEYS

United States Patent Office 2,875,264

Patented Feb. 24, 1959

2,875,264

BRACKET MEANS FOR JOINING PRINTED CIRCUIT PANELS

Irving A. Gross, Warrensville Heights, Ohio, assignor to Cleveland Metal Specialties Company, Cleveland, Ohio, a corporation of Ohio Application May 31, 1956, Serial No. 588,446

4 Claims. (Cl. 174—88)

Figures 1, 2, 3:
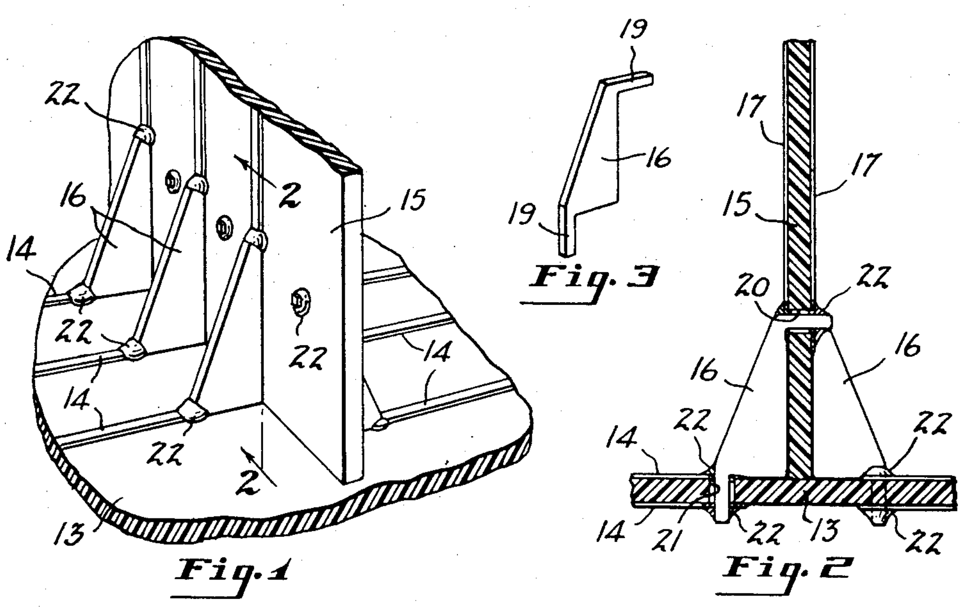

This invention relates to electric circuit panels, generally known as printed circuits, and more particularly to novel means for electrically and mechanically joining and structurally supporting two or more printed panels with respect to each other, whereby the applications of printed circuit techniques can be considerably expanded.

Printed circuits are in extensive use in radio, television, computers and other electric and electronic devices and systems. In the completed form, each circuit panel comprises a piece of dielectric material, usually flat, on one or both surfaces of which are strips and other configurations of metal or metallic foil arranged in a predetermined pattern to provide circuit connections between devices operatively associated with or mounted on the panel. The panel may have apertures for the reception and mounting or soldering of contact elements cooperable with the metal circuit elements.

In many applications, considerations of space, heat, aesthetics or other factors make it desirable or necessary to position standard replaceable electrical components, such as tubes, coils, capacitors and the like, in such positions with relation to a circuit panel that they cannot be mounted normally to the panel. For example, it is frequently desirable to mount tubes at right angles to a printed panel, with the tube parallel to the panel. This has been accomplished in the prior art by the relatively costly provision of so-called right angle tube sockets which comprise a body or casing having female connector elements for reception of a tube and male connector elements which are received on the circuit panel and which extend at right angles to the female connector elements, the female and male connectors being electrically joined by wire leads which are carried on or within the body or casing.

In many applications, it is also desirable that the system comprise more than one printed panel, with the panels electrically and structurally associated with each other. In the prior art this has been generally avoided because of the greater desirability of eliminating the complications entailed in structurally joining the boards and also making all the necessary electrical interconnections.

An object of the present invention is to resolve the difficulties which the prior art has encountered in the above respects by integrating the means for electrically and mechanically associating the circuit panels with each other.

According to the present invention, a secondary circuit panel is provided with apertures located along an edge which is placed against one side of a primary circuit panel. The primary panel is also provided with apertures which may be distributed in generally parallel relationship with the same edge. A plurality of buttress ribs of conducting metal or equivalent material are positioned in buttressing engagement with both the primary and secondary circuit panels and are each provided with pairs of protruding contact elements which are received and bonded or soldered within the apertures to anchor the buttress ribs and establish electrical connections with the metal circuit elements on each circuit panel. Preferably, the buttress ribs are positioned on both sides of the secondary circuit panel, the buttress ribs on one side of the secondary circuit panel preferably having a supplemental relationship with the buttress ribs on the other side of the secondary circuit panel.

Figure 4:
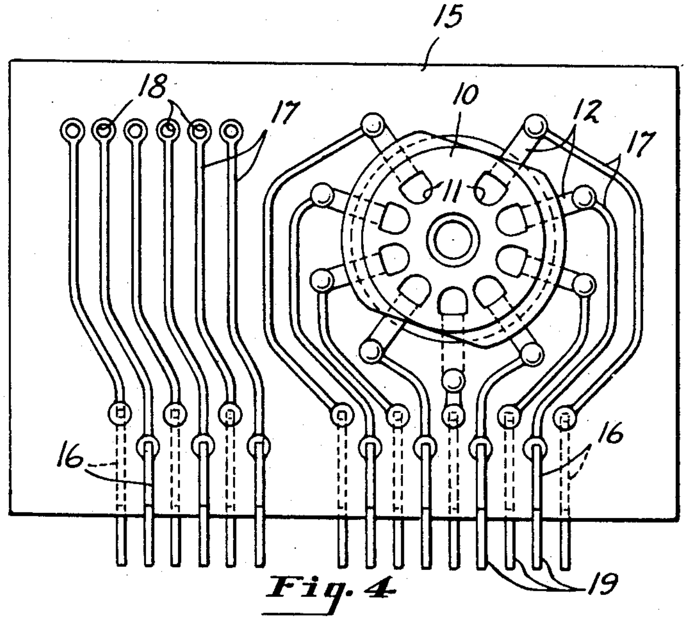
Figure 5:
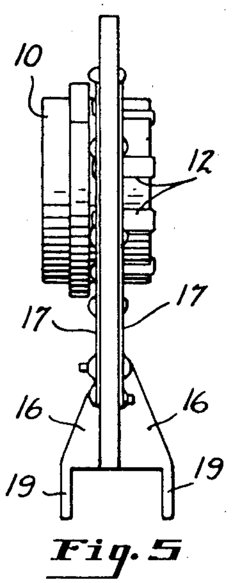
Figure 6:
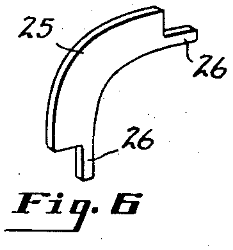
Figure 7:
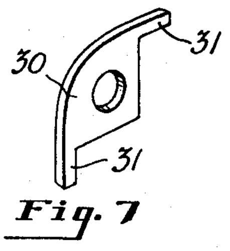

The above and other objects and advantages of the invention and the features thereof will become more fully apparent from the following description of one embodiment of the invention. The description is given by way of example and refers to the accompanying drawings. In the drawings, Figure 1 is a perspective fragmentary view of a juncture between two circuit panels, Figure 2 is a section taken on line 2—2 in Figure 1. Figure 3 is an isometric view of one of the buttress ribs shown in the other figures. Figure 4 is an elevation showing the upright circuit panel of Figures 1 and 2, together with associated buttress ribs, the horizontal circuit panel of Figures 1 and 2 being omitted. Figure 5 is a side view of the structure shown in Figure 4. Figures 6 and 7 are isometric views of other forms of buttress ribs.

It should be understood that the terms "primary" and "secondary" as used herein with reference to the circuit panels have no limiting significance and are applied merely as labels of convenience.

In Figures 4 and 5 there is shown a conventional tube socket 10 which is provided with a plurality of prong-receiving clips (not shown) positioned within the openings 11 and adapted to receive the prong connectors of a vacuum tube component (not shown). The body of the tube socket comprises a dielectric, and the prong-receiving clips are provided with leads 12 which are adapted to be connected to the circuit in which the tube is to be employed, as is conventional.

In the particular example of the invention, there is provided a primary dielectric circuit board 13 (Figures 1 and 2) having printed thereon an elaborate circuit (not shown), which circuit includes the metallic strips 14. It will be assumed that, in the design of the system in which this example of the invention is embodied, it was desired to mount the socket 10 so that the tube held therein would be parallel to the circuit board 13. It may also be assumed that it was desired to mount an additional multi-terminal component (not shown) so that it would be spaced from the circuit panel 13 and would be accessible from the direction in which the tube extends.

According to the invention, a circuit 15 is electrically and structurally associated with the circuit panel 13 by means of a plurality of buttress ribs 16 of conducting material. The circuit panel 15 supports a plurality of metallic strips 17, some of which are connected by conventional means to the leads 12, and others of which comprise electrical paths communicating with conventional connection terminals such as the metallic-rimmed apertures 18, designed to receive the terminals of the above mentioned additional multi-terminal component. Each of the buttress ribs 16 is in buttressing engagement with both of the circuit panels 13 and 15 and is provided at its two outer corners with projections 19 which project into or through the circuit panels 13 and 15, being received in the apertures 20 and 21, respectively. The printed strips 14 and 17 lead to or past the apertures 20 and 21.

In the illustrated embodiment of the invention, buttress ribs 16 are alternately located on each side of the panel 15, the buttress ribs on one side being slightly larger than those on the opposite side to provide a staggered relationship of the apertures 20, as may be seen in Figure 4. The buttress ribs 16 on one side of the panel 15 supplement the buttress ribs on the other side of the panel 15.

As used hereinafter, the term "rib angle" will be used to refer to the angle formed by the intersection of the two panel-abutting sides of a buttress rib (or by projections thereof, should the panel-abutting sides themselves not intersect). In the illustrated example, the rib angles are each 90°, but it will be apparent that if it is desired to support the panel 15 at an angle of, say, 75° with respect to the panel 13, then the buttress ribs on one side of the panel 15 may have a rib angle of 75° and those on the other side may have a rib angle of 105°. In some cases, it may be feasible and desirable to provide buttress ribs on one side only of each of the co-joined panels.

At the apertures 20 and 21, the projections 19 are soldered, as indicated at 22, to their associated printed strips 14 and 17 in any conventional manner. In some applications where the techniques of dip soldering are to be fully exploited, it may be advisable to print the panels 13 and 15 on only one side and to position buttress ribs on one side only of each of the co-joined panels so that all connections may be readily effected by dip soldering. In other cases, the projections 19 may be flux coated or plated to prime the metal prior to positioning in the apertures 20 and 21 to cause solder to be drawn up through these apertures during dip soldering, so that connections are established on either or both sides of the particular panel involved.

It will be seen that in the example of the invention described above, the assumed design requirements (whereby the tube associated with the socket and the circuit component associated with the apertures 18 were to be positioned as above indicated with respect to the panel 13) have been met without the use of wire leads or the provision of right angle tube sockets or other special parts. The buttress ribs double as electrical connectors and mechanical supports between the panel 13 and the additional panel 15 which may be printed as readily as and simultaneously with the panel 13. As thus illustrated, the invention considerably expands the possible applications of printed circuit techniques. In another aspect, the invention would make it feasible to print on several panels and then readily interrelate in a three-dimensional compact array a plurality of subcircuits, whereby incredibly complex circuiting could be designed and manufactured at low cost to fit within restricted dimensions.

It should be apparent that the buttress ribs described above may be varied in specific details. For example, buttress ribs, such as the rib 25 shown in Figure 6, may be provided. Here both panel-engaging sides of the buttress rib are of equal length, and the buttress rib is formed as an arc with projections 26 provided, as shown, corresponding to the projections 19. The projections 26 are located toward, but not on the outer corners of, the buttress rib 25 for the purpose of illustrating that it is not critical that they be located at the outermost point of each panel-engaging side of the rib, although generally it is highly advantageous to so locate them because such location will afford the most mechanically strong point (in tension) for a buttress rib of given size. In any event, at least one of them is located in spaced relation from the vertex of the rib angle.

Figure 7 illustrated another possible form of buttress ribs 30 having projections 31, the general characteristics of which will be apparent from the illustration.

The scope of the invention is not to be limited to specific details set forth in the above description but is to be defined by the following claims.

What is claimed is:

1. A structure for a printed circuit system comprising a plurality of components making up the system, said components including a first dielectric panel having a plurality of first metallic paths of conductance printed thereon, a second dielectric panel having a plurality of second metallic paths of conductance printed thereon, said second panel extending at an angle from said first panel with one edge of said second panel adjacent to said first panel, perforations in each of said panels and communicating with said metallic paths of conductance, an array of buttress ribs of conducting material on opposite sides of said second panel, the buttress ribs on each side of said second panel being supplemental to the buttress ribs on the other side of said second panel, said buttress ribs being in buttressing engagement with said first and second panels, projections on the outside corners of each of said buttress ribs extending into said perforations in each of said panels, and soldered connections at each of said perforations whereby said buttress ribs electrically connect said first and second paths of conductance and structurally support said panels with respect to each other.

2. A structure for a printed circuit system comprising a plurality of components making up the system, said components including a first dielectric panel having a plurality of first metallic paths of conductance printed thereon, a second dielectric panel having a plurality of second metallic paths of conductance printed thereon, said second panel extending at an angle from said first panel with one edge of said second panel adjacent to said first panel, at least one first series of perforations in said first panel which series extends parallel to said one edge, at least one second series of perforations in said second panel which series also extends parallel to said one edge, said first paths of conductance communicating with said first series of perforations, said second paths of conductance communicating with said second series of perforations, a plurality of buttress ribs of conducting material in buttressing engagement with each of said panels, each of said buttress ribs having projections extending into one of said first series of perforations and into one of said second series of perforations, and soldered connections at each of said perforations whereby said buttress ribs electrically connect said first and second paths of conductance and structurally support said panels with respect to each other.

3. A structure for a printed circuit system comprising a plurality of components making up the system, said components including a first dielectric panel having a plurality of first metallic paths of conductance printed thereon, a second dielectric panel having a plurality of second metallic paths of conductance printed thereon, said second panel extending at an angle from said first panel with one edge of said second panel adjacent to said first panel, perforations in each of said panels and communicating with said metallic paths of conductance, an array of buttress ribs of conducting material on opposite sides of said second panel, the buttress ribs on each side of said second panel being supplemental to the buttress ribs on the other side of said second panel, said buttress ribs being in buttressing engagement with said first and second panels, projections on said buttress ribs extending into said perforations in each of said panels, and soldered connections at each of said perforations whereby said buttress ribs electrically connect said first and second paths of conductance and structurally support said panels with respect to each other.

4. A structure for a printed circuit system comprising a plurality of components making up the system, said components including a first dielectric panel having a plurality of first metallic paths of conductance printed thereon, a second dielectric panel having a plurality of second metallic paths of conductance printed thereon, said second panel extending at an angle from said first panel with one edge of said second panel adjacent to said first panel, at least one first series of perforations in said first panel, at least one second series of perforations in said second panel, said first paths of conductance communicating with said first series of perforations, said second paths of conductance communicating with said second series of perforations, a plurality of buttress ribs of conducting material in buttressing engagement with each of said panels, each of said buttress ribs having projections extending into one of said first series of perforations and into one of said second series of perforations, and soldered connections at each of said perforations whereby said buttress ribs electrically connect said first and second paths of conductance and structurally support said panels with respect to each other.

References Cited in the file of this patent

UNITED STATES PATENTS

| | | |
|---|---|---|
| 49,419 | Kuhnle | Aug. 15, 1865 |
| 1,983,470 | Knape | Dec. 4, 1934 |

OTHER REFERENCES

Buggie Catalog HHB No. 3366.